Dec. 19, 1950   J. O. PRICE   2,534,987
ELECTRICALLY CONTROLLED DISPENSING
VALVE AND COUNTER
Filed April 5, 1948   3 Sheets-Sheet 1
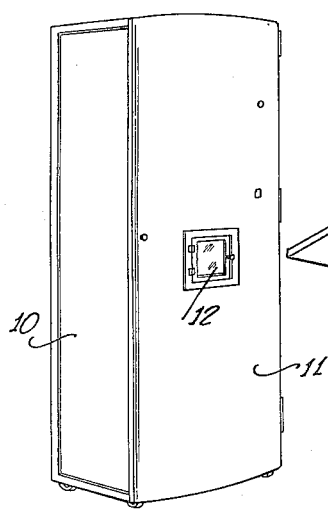
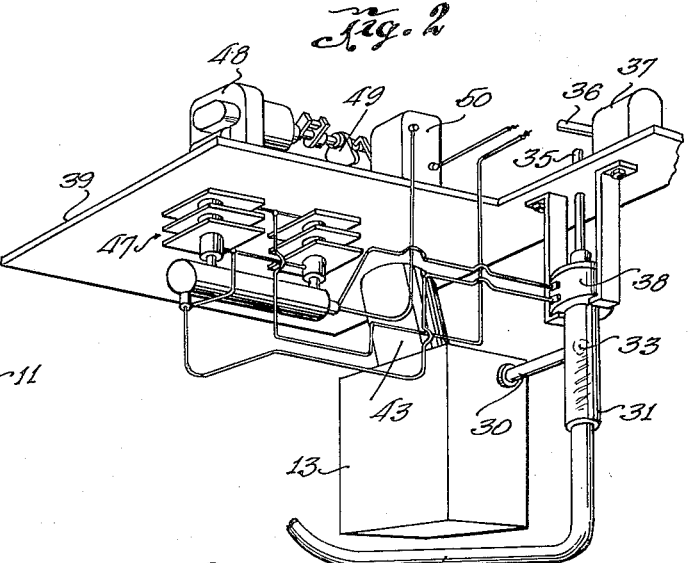
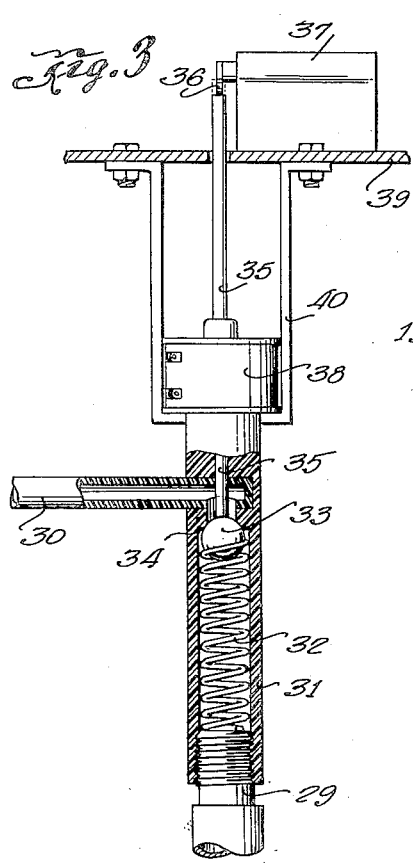
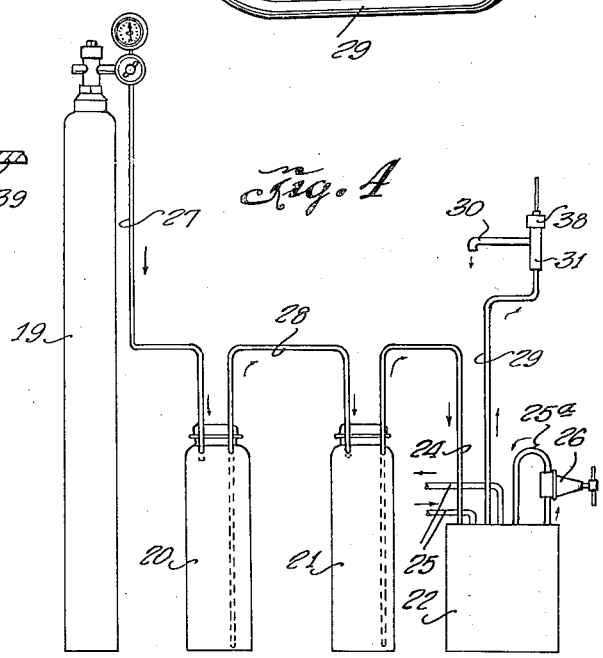
James O. Price
INVENTOR.
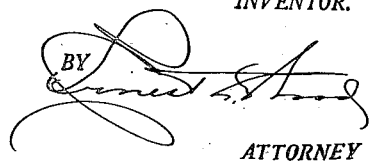
ATTORNEY

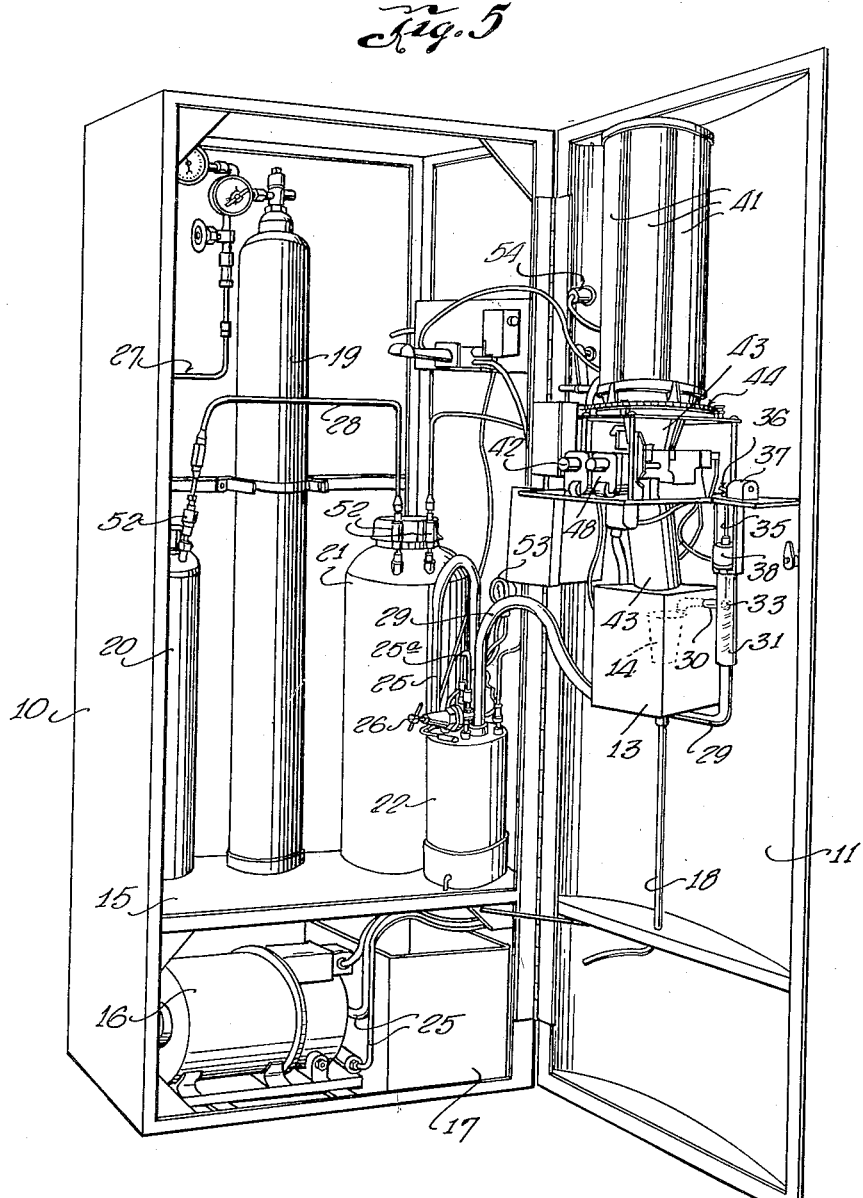

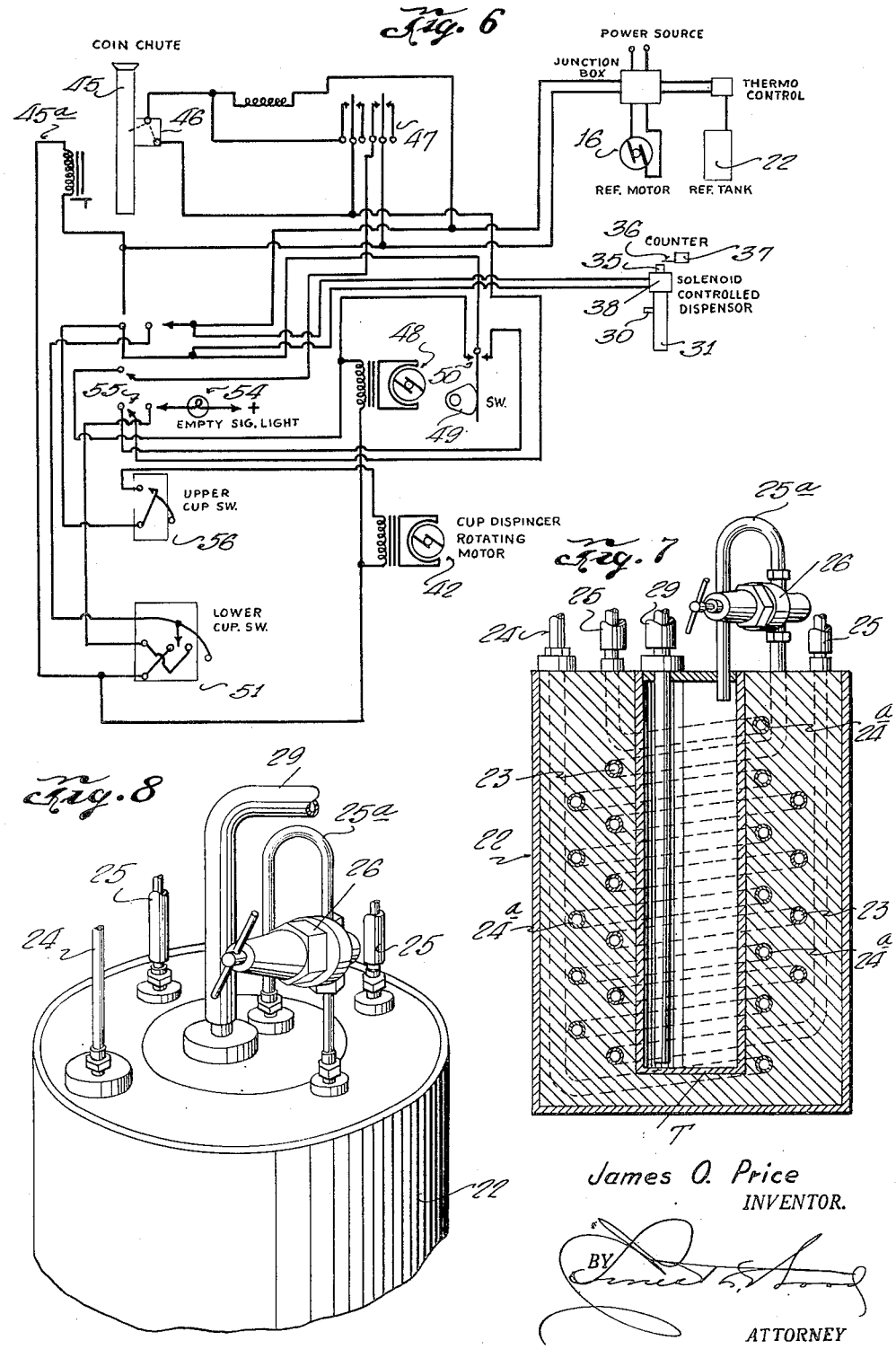

Patented Dec. 19, 1950

2,534,987

UNITED STATES PATENT OFFICE 2,534,987

ELECTRICALLY CONTROLLED DISPENSING VALVE AND COUNTER

James O. Price, Dallas, Tex.

Application April 5, 1948, Serial No. 18,910

1 Claim. (Cl. 225—21)

This invention relates to beverage vending machines and it has particular reference to a coin operated machine for vending beverage in cups.

The principal object of the invention is to provide a machine for vending a pre-mixed refrigerated beverage in expendable paper cups, and by virtue of the provision for dispensing the beverage already charged with $CO_2$ gas, the necessity for carbonating water and mixing the same with a flavoring syrup, is obviated. By so doing, many objectionable characteristics present in machines wherein the water content of the beverage is carbonated are eliminated, among which are the inability to maintain consistency of flavor due to variation in the chemical properties of the water in different localities; the requirement for maintenance of uniform pressure control of syrup, water and carbon dioxide gas; the necessity of providing a mixing valve for these ingredients. Moreover, the present invention seeks to minimize the cost of producing and servicing a machine for vending beverage in cups and at the same time simplify such servicing by enabling the operator to replace depleted beverage tanks with full tanks which have been charged at a beverage plant under sanitary conditions, thus insuring the consumer of a healthful beverage of uniform flavor and temperature.

Another object of the invention is to provide a machine for vending beverage in cups which includes one or more beverage tanks in which is maintained a constant and predetermined pressure of carbon dioxide gas from a $CO_2$ drum, which forces the beverage from a tank through a coil in heat exchange relationship with the expansion coil of a refrigerating unit and thence through a heat insulated line to a solenoid controlled faucet. By virtue of a conventional cup dispensing apparatus, whose electrical system is energized by the insertion of a coin into the machine, a paper cup is deposited in a position to receive beverage from the faucet when opened by its solenoid, the quantity of the beverage being dispensed being determined by a rotary cam effective to actuate a switch for opening and closing the circuit to the solenoid through a rectifier.

Broadly, the invention seeks to provide a machine of the type set forth which is simple and economical by comparison and because of its simplicity of design and assembly, is not as likely to become fouled or rendered inoperative by failure on the part of its mechanism as the more complex vending machines which are dependent upon municipal water sources and pressure for the principal ingredient of their beverage and upon water carbonators which at their best lack the facility to thoroughly combine the $CO_2$ gas and water as it is accomplished by a bottling plant to render the mixture uniformly palatable in a flavored beverage.

With the foregoing objects in view, the invention has further reference to certain features of accomplishment which will become apparent as the description proceeds, taken in connection with the accompanying drawings wherein:

Figure 1 is a front perspective view of the preferred form of cabinet adapted to house the invention.

Figure 2 is a perspective view of an assembly of parts comprising a portion of the cup dispenser, rectifier, cup receiving chamber, beverage dispensing head and drink counter.

Figure 3 is a detail elevational view of the beverage dispensing head partly in section, showing the valve, operating solenoid and counter.

Figure 4 is a schematic view of the $CO_2$ gas drum, beverage tanks, heat exchanger and beverage dispensing head.

Figure 5 is a front perspective view of the cabinet with the door open to reveal the vending equipment.

Figure 6 is a wiring diagram.

Figure 7 is a vertical sectional view of the heat exchanger, and

Figure 8 is a fragmentary top perspective view of the heat exchanger.

Continuing with a more detailed description of the drawings, reference is primarily made to Figures 1 and 5 wherein numeral 10 denotes a cabinet of any suitable exterior design and in the door 11 thereof is an opening having a glass closure 12, hingedly or slidably mounted. Affixed to the inner surface of the door 11 to embrace the said opening is an enclosure serving as a receptable 13 for paper cups 14, one of which is shown in dotted lines in Figure 5 in a position to receive beverage and which is made accessible by opening the small door 12, which, when closed, prohibits entrance of dust and other foreign matter into the receptacle 13, including insects which may be attracted by the syrup.

Separated from the upper section of the cabinet by a transverse partition 15 is a lower compartment in which is installed a refrigerating mechanism 16 of conventional manufacture. Adjacent this mechanism is a receptacle 17, which receives overflow or drainage from the cup receptacle 13 through drain pipe 18, mounted on the door 11 and extending from the bottom of receptacle 13 downward to the receptacle 17 and entering the same when the door 11 is closed.

Resting on the partition or platform 15 is a carbon dioxide gas tank 19; two identical beverage drums 20 and 21 and a heat exchanger 22. One or more beverage drums or tanks may be used, which determines the capacity of the machine. The heat exchanger 22 consists of a molded block of aluminum in which is embedded both the coil 23 of the beverage line 24 and the evaporator coil 24a of the line 25, communicating with the refrigerating unit 16, in heat exchange relationship, in order to maintain low temperature of the beverage flowing through line 24 and coil 23.

Within the molded metal block which is in the jacket of the heat exchanger 22 is a tank T into which is discharged the beverage through a goose-neck 25a and regulating valve 26, after passing through coil 23 embedded in the metal jacket of the heat exchanger. The beverage under $CO_2$ gas pressure in line 27 is transferred from tank 20 to tank 21 through connecting line 28 to replace beverage drawn from tank 21 through line 24, coil 23 and the insulated dispensing line 29, which latter connects the tank T of the heat exchanger and faucet 30 through a dispensing head 31.

If the beverage were to be permitted to flow directly from the storage tanks 20 and 21 to the faucet, undue ebullience would occur at the faucet, due to uncontrolled and excessive gas pressure. Instead, the invention provides that the beverage be first discharged into the cooler tank T through the pressure regulator 26 which has the effect not only to reduce the pressure on the beverage but also serves as a means for closing entirely the flow of beverage to the faucet when this becomes necessary or desirable. Thus, under the modified pressure of gas in the tank T, the beverage continues to the faucet 30 through the insulated line 29 and delivery head 31.

Since the beverage storage tanks 20 and 21 are charged with gas at a loading plant, they contain adequate pressure to exhaust them of beverage without the added pressure of the $CO_2$ gas in the tank 19. However, since the $CO_2$ gas content of the beverage tends to separate from the latter unless replenished the tank 19 is provided for this purpose and maintains uniform carbonization of the beverage at all times.

The beverage line 29 which transports beverage from the cooler 22 enters the lower end of a delivery head 31 which is preferably made of transparent plastic material of low heat conductivity, in which is disposed a coil spring 32 (Fig. 3) the latter bearing against a ball valve 33, holding the same against a seat 34, thus restraining beverage against entering the faucet 30. The spring 32, ball 33 and also a stem 35 entering the member 31 axially from the top thereof are all fashioned from stainless steel or other material which will be unaffected by the beverage. The stem 35 is adapted to actuate an arm 36 of a conventional counter 37 each time the valve 33 is displaced to record the number of drinks dispensed.

At the top of the delivery head 31 is arranged a solenoid 38 which, upon being energized, in a manner to be presently explained, exerts a downward thrust on the ball valve 33, displacing the same for a duration sufficient to release a predetermined quantity of beverage through the faucet 30 into a waiting cup 14. The solenoid 38 and delivery head 31 are supported from a platform 39 by a depending frame 40, the platform being secured to the inside of the cabinet door 11 above the cup receptacle 13.

The cup dispensing unit, being of conventional design, a detailed description thereof is deemed unnecessary, it being considered sufficient to point out that the dispenser consists of a radial group of vertical cup magazines 41 (Fig. 5) which are collectively rotated by means of an electric motor 42 (Fig. 6) to align a full magazine 41 with a chute 43 when the preceding magazine is depleted. A circular gear 44 imparts rotation to the magazine assembly when actuated by the motor 42.

In operation, a coin is deposited into the coin chute 45 (Fig. 6) with which is associated a conventional slug rejector represented by numeral 45a. The coin actuates a switch 46 to close the circuit through a relay 47 to a motor 48 to set in motion a metering cam 49, the latter closing a switch 50 to energize the solenoid 38 of the delivery head 31.

Immediately preceding energization of the delivery head solenoid 38, a cup switch 51 (Fig. 6) is actuated to release a cup 14 from an active magazine 41, permitting the cup to drop into an upright position in the receptacle 13 to receive beverage when it emerges from the faucet 30 upon energization of solenoid 38 as explained.

When the cam 49 has completed its cycle of operation, the position of switch 50 will be reversed, deenergizing the solenoid 38 to close the valve 33 and suspend flow of beverage from the faucet 30.

As beverage is drawn from the cooler tank T, it is replaced by beverage from the tank 21 and thence from tank 20. When one or both tanks have been emptied, snap connector valves 52 (Fig. 5) which join the fluid lines 24, 27 and 28 to their respective tanks enable an attendant to speedily exchange full for empty tanks without loosing any of the $CO_2$ gas from the system. A pressure gauge 53 (Fig. 5) is provided to indicate pressure of gas in the cooler tank T.

When all of the cups have been dispensed from the magazines 41, an empty sign lamp 54 is illuminated through a switch 55 (Fig. 6). This switch becomes operative through a cup switch 56 which, in turn, is actuated when the last cup of the last magazine 41 is dropped into position in the receptacle 13, to open the slug rejector switch 45a, which is so designed that the deposited coin is returned. A similar arrangement, not shown, provides for illumination of the empty signal lamp 54 when the beverage tanks 20 and 21 are depleted.

Manifestly, the construction as shown and described is capable of some modification and such modification as may be construed to fall within the scope and meaning of the appended claim is also considered to be within the spirit and intent of the invention.

What is claimed is:

In a drink vending machine, a beverage delivery head comprising a tubular member composed of transparent material of low heat conductivity having a check valve therein, a faucet connected with said member above said valve, a spring below said valve normally seating the same, a solenoid above said valve to open the same against the resistance of said spring, a stem reciprocably arranged in said tubular member and actuated also by said solenoid and a counter above said solenoid actuated by said stem to compute the drinks vended by said machine.

JAMES O. PRICE.

REFERENCES CITED

The following references are of record in the file of this patent:

UNITED STATES PATENTS

| Number | Name | Date |
|---|---|---|
| 2,284,880 | Nicholson | June 2, 1942 |